June 2, 1942.  F. H. MUELLER  2,285,223
ROTARY OPERATOR AND RETAINER RING ASSEMBLY
Filed Dec. 6, 1940

Inventor
Frank H. Mueller
By Cushman Darby & Cushman
Attorneys

Patented June 2, 1942

2,285,223

UNITED STATES PATENT OFFICE 2,285,223

ROTARY OPERATOR AND RETAINER RING ASSEMBLY

Frank H. Mueller, Decatur, Ill., assignor to Mueller Co., Decatur, Ill., a corporation of Illinois Application December 6, 1940, Serial No. 368,938

7 Claims. (Cl. 74—548)

This invention relates to an assembly comprising a rotary operator member, for example for a rotary valve, and a retainer ring for the operator member. According to the invention the operator member has a circular flange from which rises a T-head, and the retainer ring comprises a cylindrical portion designed to embrace and an internal flange designed to overlie the circular flange. With the operator formed in a single piece and with the cross portion of the head of adequate length, i. e. greater than the diameter of the opening defined by the internal flange of the retainer ring, the problem is how to operatively assemble the two parts with the internal flange of the ring between the circular flange and the cross portion of the operator member. The solution of this problem is the object of the present invention, and the manner in which it is accomplished will be described with reference to the accompanying drawing in which:

Figure 1:
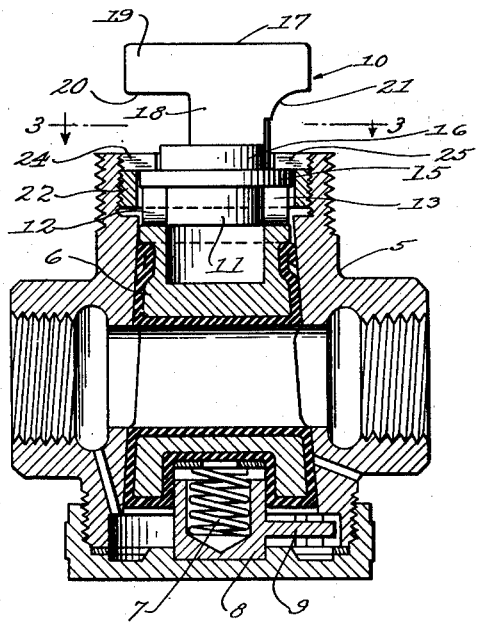
Figure 1 is an axial section of a rotary valve equipped with the operator member and retainer ring of the present invention.

The general arrangement of parts shown in the drawing is disclosed in my copending application Serial No. 339,367, filed June 7, 1940, and consequently need be but briefly mentioned here. Reference numeral 5 designates a valve casing with a conical seat and reference numeral 6 a mating conical rubber-clad plug. The plug is seated by a spring 7 disposed in a cup 8 which rotates with the plug, the cup having an arm 9 which cooperates with abutments in the base of the casing to limit the turn of the plug.

Figure 2:
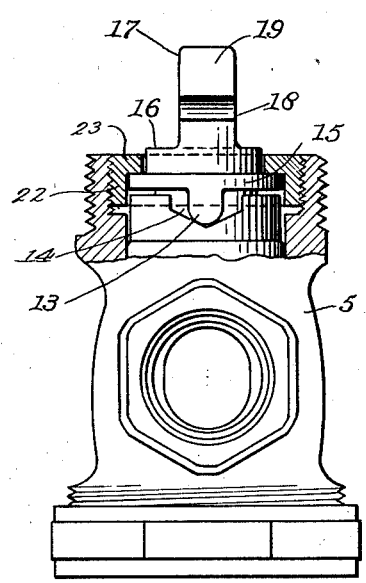
Figure 2 is an elevation of the valve of Figure 1 as seen from the right.

The operator member 10, formed as a single part, has a lower boss portion 11 received in a neck portion of the plug and lugs 12 and 13 projecting laterally from the boss portion are received in opposite notches as at 14 in the neck, the notches being configured as shown in Figure 2 so that upon rotation of the operator member the plug will be unseated before it is turned.

Boss portion 11 and lugs 12 and 13 are surmounted by a coaxial circular flange 15 and above the latter is a co-axial circular boss 16 of reduced diameter from which rises the T-head 17. The head 17 includes a stem portion 18 and a cross portion 19 and is flat faced and of substantial thickness. Stem 18 is provided with a recess 20 which extends inwardly beyond the underlying edge of the circular flange 15, while at the other end of the cross portion a recess 21 merges the stem into the boss 16.

Figure 3:
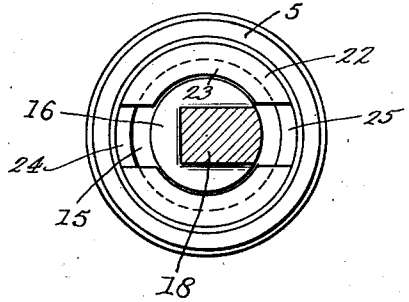
Figure 3 is a section on line 3—3 of Figure 1.

Reference numeral 22 designates the retainer rings which comprises a cylindrical externally threaded portion having a top internal annular flange 23. The ring is threaded in the neck of casing 5, Figures 1 to 3, the cylindrical portion of the ring embracing flange 15 and the flange 23 overlying flange 15 and embracing boss 16 so that the operator member is rotatably maintained in proper relation to the plug. Flange 23 is provided with diametrically opposite slots 24 and 25 which extend through the cylindrical portion, the slots being somewhat wider than cross portion 19 of the head 17. The slots are engageable by a spanner wrench for the purpose of screwing the ring in and out of the neck of the valve casing.

Figure 4:
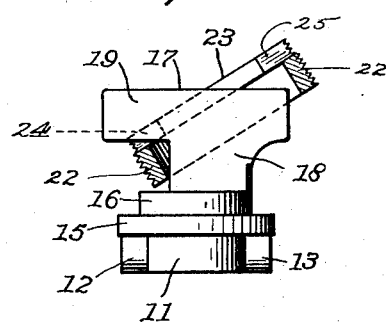
Figure 4 shows the operator member in elevation and the retainer ring in section in process of assembly.

In order to assemble ring 22 operatively with the operator member, the ring is engaged in recess 20 with the lower left hand end of head 19 in slot 24 as shown in Figure 4. The ring can now be swung over the right hand end of the cross portion as permitted by slot 25 and then brought into operative relation with flange 15.

With the above described provisions stem 18 and cross portion 19 may be made of adequate strength and the latter of adequate length for convenient operation. As here shown, ring 22 is of substantial depth and flange 23 of substantial width so that with the operator member proportioned as shown, it is necessary to provide the two slots 24 and 25. With a narrower flange 23 and a shallower cylindrical portion the ring might be applicable to the disclosed operator member in the absence of one or both of slots 24 and 25, or the slots might not be continued through the cylindrical portion of the ring. Ordinarily, however, two slots are provided as shown.

It will be evident, however, that the invention is not necessarily confined to the specific disclosure herein, since variation in the form of the parts may be made without departure from the following claims.

I claim:

1. An assembly comprising a rotary operator member formed integrally with a circular flange and with a T-head including a cross portion and a stem, and a retainer ring for said operator having a cylindrical portion designed to embrace and an internal flange designed to overlie said circular flange, said cross portion having a length greater than the maximum dimension of the opening defined by said internal flange, said stem occupying an offset position toward one end of said cross portion with respect to the axis of said circular flange to provide a recess under the other end of said cross portion such that by engaging one side of said ring in said recess the ring may be swung over said one end of said cross portion and operatively engaged with said circular flange.

2. An assembly comprising a rotary operator member formed integrally with a circular flange, with a circular boss portion concentric with said flange, and with a T-head including a cross portion and a stem portion, the latter rising from said boss portion; and a retainer ring for said operator having a cylindrical portion designed to embrace and an internal flange designed to overlie said circular flange, said internal flange embracing said boss portion, said cross portion of said head having a length greater than the diameter of the opening defined by said internal flange, said stem being recessed under one end of said cross portion inwardly beyond the underlying portion of said boss portion and being recessed under the other end of said cross portion so as to substantially merge into said boss portion, whereby by engaging one side of said ring in the first named recess the ring may be swung over the other side of said cross portion and operatively engaged with said circular flange and boss portion.

3. An assembly comprising a rotary operator member formed integrally with a circular flange and a T-head including a cross portion and a stem portion, and a retainer ring for said operator having a cylindrical portion designed to embrace and an internal flange designed to overlie said circular flange, said cross portion having a length greater than the diameter of the opening defined by said internal flange and than the inner diameter of said cylindrical portion, said stem being recessed under one end of said cross portion and said internal flange being provided with opposite slots of greater width than said cross portion so that by engaging the ring in said recess with said one end of the cross portion in one of said slots the ring may be swung over the other end of said cross portion and operatively engaged with said circular flange.

4. An assembly comprising a rotary operator member formed integrally with a circular flange and a T-head including a cross portion and a stem portion, and a retainer ring for said operator having a cylindrical portion designed to embrace and an internal flange designed to overlie said circular flange, said cross portion having a length greater than the diameter of the opening defined by said internal flange and the inner diameter of said cylindrical portion, said stem being recessed under one end of said cross portion and said internal flange being provided with opposite slots of greater width than said cross portion and extending through said cylindrical portion so that by engaging the ring in said recess with said one end of the cross portion in one of said slots the ring may be swung over the other end of said cross portion and operatively engaged with said circular flange.

5. An assembly comprising a rotary operator member formed integrally with a circular flange, with a circular boss portion concentric with said flange, and with a T-head including a cross portion and a stem portion, the latter rising from said boss portion; and a retainer ring for said operator having a cylindrical portion designed to embrace and an internal flange designed to overlie said circular flange, said internal flange embracing said boss portion, said cross portion having a length greater than the diameter of the opening defined by said internal flange and than the diameter of said circular flange, said stem being recessed under one end of said cross portion inwardly beyond the underlying portion of said boss portion and being recessed under the other end of said cross portion so as to substantially merge into said boss portion and said internal flange being provided with opposite slots of greater width than said cross portion, so that by engaging the ring in the first named recess with said one end of the cross portion in one of said slots, the ring may be swung over the other end of said cross portion and operatively engaged with said circular flange and boss portion.

6. An assembly comprising a rotary operator member formed integrally with a circular flange, with a circular boss portion concentric with said flange, and with a T-head including a cross portion and a stem portion, the latter rising from said boss portion; and a retainer ring for said operator having a cylindrical portion designed to embrace and an internal flange designed to overlie said circular flange, said internal flange embracing said boss portion, said cross portion having a length greater than the diameter of the opening defined by said internal flange and than the diameter of said circular flange, said stem being recessed under one end of said cross portion inwardly beyond the underlying portion of said boss portion and being recessed under the other end of said cross portion so as to substantially merge into said boss portion and said internal flange being provided with opposite slots of greater width than said cross portion and extending through said cylindrical portion, so that by engaging the ring in the first named recess with said one end of the cross portion in one of said slots, the ring may be swung over the other end of said cross portion and operatively engaged with said circular flange and boss portion.

7. An assembly comprising a rotary operator member formed integrally with a circular flange and with a T-head including a cross portion and a stem, and an externally threaded retainer ring for said operator having a cylindrical portion designed to provide a bearing for said circular flange and an internal flange designed to overlie said circular flange, said cross portion having a length greater than the maximum dimension of the opening defined by said internal flange, said stem occupying an offset position toward one end of said cross portion with respect to the axis of said circular flange to provide a recess under the other end of said cross portion such that by engaging one side of said ring in said recess the ring may be swung over said one end of said cross portion and operatively engaged with said circular flange, said cylindrical portion being adapted to guide said circular flange for relative axial movement.

FRANK H. MUELLER.